United States Patent
Qu et al.

(10) Patent No.: US 8,847,464 B2
(45) Date of Patent: Sep. 30, 2014

(54) ELECTRICAL MACHINE WITH IMPROVED STATOR FLUX PATTERN ACROSS A ROTOR THAT PERMITS HIGHER TORQUE DENSITY

(75) Inventors: Ronghai Qu, Clifton Park, NY (US); Patrick Lee Jansen, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 1424 days.

(21) Appl. No.: 12/138,182

(22) Filed: Jun. 12, 2008

(65) Prior Publication Data
US 2009/0309442 A1    Dec. 17, 2009

(51) Int. Cl.
  H02K 16/02  (2006.01)
  H02K 21/12  (2006.01)
  H02K 21/24  (2006.01)
  H02K 21/02  (2006.01)
  H02K 16/00  (2006.01)
  H02K 7/18   (2006.01)

(52) U.S. Cl.
  CPC ............... *H02K 16/02* (2013.01); *H02K 21/12* (2013.01); *H02K 7/1823* (2013.01); *H02K 21/24* (2013.01); *H02K 21/02* (2013.01)
  USPC .......................................... 310/266; 310/114

(58) Field of Classification Search
  CPC ............................... H02K 16/02; H02K 16/00
  USPC ......................................... 310/266, 114, 269
  See application file for complete search history.

(56) References Cited

U.S. PATENT DOCUMENTS

| 4,501,980 | A | * | 2/1985  | Welburn ................... 310/266 |
| 4,757,220 | A |   | 7/1988  | Pouillange                          |
| 4,758,756 | A | * | 7/1988  | Pouillange ................ 310/266 |
| 6,013,962 | A | * | 1/2000  | Nashiki .................... 310/156.55 |
| 7,154,191 | B2|   | 12/2006 | Jansen et al.                       |
| 2006/0131985 | A1 | * | 6/2006 | Qu et al. ................... 310/266 |
| 2007/0186692 | A1 |   | 8/2007 | Waszak et al.                       |

FOREIGN PATENT DOCUMENTS

EP    0158935    10/1985

OTHER PUBLICATIONS

K. Atallah; D. Howe; A Novel High-Performance Magnetic Gear; Publisher Item Identifier S 0018-9464(01)07092-3; The University of Sheffield, Sheffield 51 3JD, England; Oct. 13, 2000.*

K. Atallah; D. Howe; A Novel High-Performance Magnetic Gear; Publisher Item Identifier S 0018-9464(01)07092-3; The University of Sheffield, Sheffield S1 3JD, England; Oct. 13, 2000.

M. Venturini; F. Leonardi; High Torque, Low Speed Joint Actuator Based on PM Brushless Motor and Magnetic Gearing; Phase arl, via f. lli Canale 50, Genova, Italy, 1993 IEEE.

Akio Toba (Fugi Electric Co.); Thomas A Lipo (University of Wisconsin-Madison); Generic Torque-Maximizing Design Methodology of Permanent Magnet Vernier Machine; 1999 IEEE.

(Continued)

*Primary Examiner* — Michael Andrews
(74) *Attorney, Agent, or Firm* — Fletcher Yoder P.C.

(57) ABSTRACT

An electrical machine is provided. The electrical machine includes a rotor comprising an inner rotor having a plurality of inner rotor poles and an outer rotor having a plurality of outer rotor poles. The electrical machine further comprises a stator configured to modulate a magnetic flux and to transmit torque to inner rotor and the outer rotor, the stator comprising a stator core interposed concentrically between the inner rotor and the outer rotor; a multiple of stator windings disposed in a plurality of stator slots, the stator windings configured to form a multiple of stator poles. The stator further comprises a plurality of stator teeth interposed between the plurality of stator slots, wherein an arithmetic sum or difference of twice number of stator teeth and a number of the stator poles equals a number of rotor poles.

7 Claims, 13 Drawing Sheets

(56) References Cited

OTHER PUBLICATIONS

Akio Toba (Fugi Electric Co.); Thomas A Lipo (University of Wisconsin-Madison); Novel Dual-Excitation Permanent Magnet Vernier Machine; 1999 IEEE.

A. Ishizaki, T. Tanaka, K. Takasaki, and S. Nishikata; Theory and Optimum Design of PM Vernier Motor; Tokyo Denki University, Japan; Electrical Machines and Drives, Sep. 11-13, 1995, Conference Publication No. 412, @ IEE, 1995.

* cited by examiner

ELECTRICAL MACHINE WITH IMPROVED STATOR FLUX PATTERN ACROSS A ROTOR THAT PERMITS HIGHER TORQUE DENSITY

BACKGROUND

The invention relates generally to electrical machines and in particular, to high torque density electrical machines.

Electrical machines, such as motors and generators are typically capable of delivering high torque and power at high speeds. However, certain applications require high torque and power at low speeds. Generally, electrical machines that deliver higher torque at lower speeds are expensive. Alternatively, a high torque at low speeds may be achieved by incorporating mechanical gearing for speed reduction. However, certain undesirable factors such as additional cost, acoustic noise, and mechanical wear and tear lead to a need for continuous lubrication and maintenance of such mechanical equipment.

Magnetic gears offer significant benefits as compared to their mechanical counterparts. These benefits include accurate position control on a drive shaft, higher torque at very low speed, and a lack of physical contact between an input shaft and an output shaft, to name only a few. However magnetic gearing is of a relatively complex design, and provides relatively low torque density.

More recently, planetary-like magnetic gear arrangements using rare-earth permanent magnets have been proposed, which result in favorable torque transmission capabilities between an inner rotor and an outer rotor. However, such systems require additional stationary windings resulting in a complex construction.

Therefore, it is desirable to provide a high torque density electrical machine that addresses the aforementioned issues.

BRIEF DESCRIPTION

According to an embodiment of the invention, an electrical machine is provided. The electrical machine includes a rotor comprising an inner rotor having a plurality of inner rotor poles and an outer rotor having a plurality of outer rotor poles. The electrical machine further comprises a stator configured to modulate a magnetic flux and to transmit torque to the inner rotor and the outer rotor, the stator comprising a stator core interposed concentrically between the inner rotor and the outer rotor; a multiple of stator windings disposed in a plurality of stator slots, the stator windings configured to form a multiple of stator poles. The stator further comprises a plurality of stator teeth interposed between the plurality of stator slots, wherein an arithmetic sum or difference of twice a number of stator teeth and a number of the stator poles equals a number rotor poles.

According to another embodiment, an electrical machine is provided. The electrical machine includes a stator comprising an inner stator having a plurality of inner stator poles and an outer stator having a plurality of outer stator poles. The stator further includes a stator core comprising a plurality of stator teeth interposed between a plurality of stator slots and defining an inner stator and an outer stator. The stator core is configured to modulate a magnetic flux and transmit torque and a plurality of stator windings disposed in the plurality of stator slots, the plurality of stator windings configured to form a plurality of stator poles. The electrical machine further includes a rotor comprising a rotor core interposed concentrically between the inner stator and the outer stator and a plurality of rotor poles disposed on an inner surface of the rotor core and an outer surface of the rotor core; wherein the number of rotor poles equals an arithmetic sum or difference of twice the number of stator teeth and the number of stator poles.

According to another embodiment, an electrical machine is provided. The electrical machine includes at least one pair of rotors having a plurality of rotor poles and at least one stator comprising a stator core having a plurality of stator teeth defining a plurality of stator slots there between. The stator core further being interposed axially between the at least one pair of rotors, and a plurality of stator windings disposed in the plurality of stator slots, the stator windings configured to form a plurality of stator poles; wherein an arithmetic sum or difference of twice the number of stator teeth and the number of the stator poles equals an arithmetic sum of the number of rotor poles.

According to another embodiment, an electrical machine is provided. The electrical machine includes at least one pair of stators having a plurality of stator poles, the at least one pair of stators comprising plurality of stator windings disposed around a plurality of stator teeth, the stator windings configured to form the plurality of stator poles. The electrical machine further includes a rotor comprising at least one rotor core interposed axially between the at least one pair of stators and a plurality of rotor poles disposed on either side of the rotor core; wherein an arithmetic sum of the number of rotor poles equals an arithmetic sum or difference of twice the number of stator teeth and the number of the stator poles.

According to another embodiment, an electrical machine is provided. The electrical machine includes a rotor comprising a rotor core and a plurality of permanent magnets embedded radially within the rotor core to form a plurality of rotor poles. The electrical machine further includes a stator comprising a stator core disposed concentrically outside the rotor and including a plurality of stator teeth defining a plurality of stator slots there between; wherein an arithmetic sum or difference of twice the number of stator teeth and the number of the stator poles equals the number of rotor poles.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In accordance with embodiments of the present invention, systems and methods for high torque density electrical machines are described herein. In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
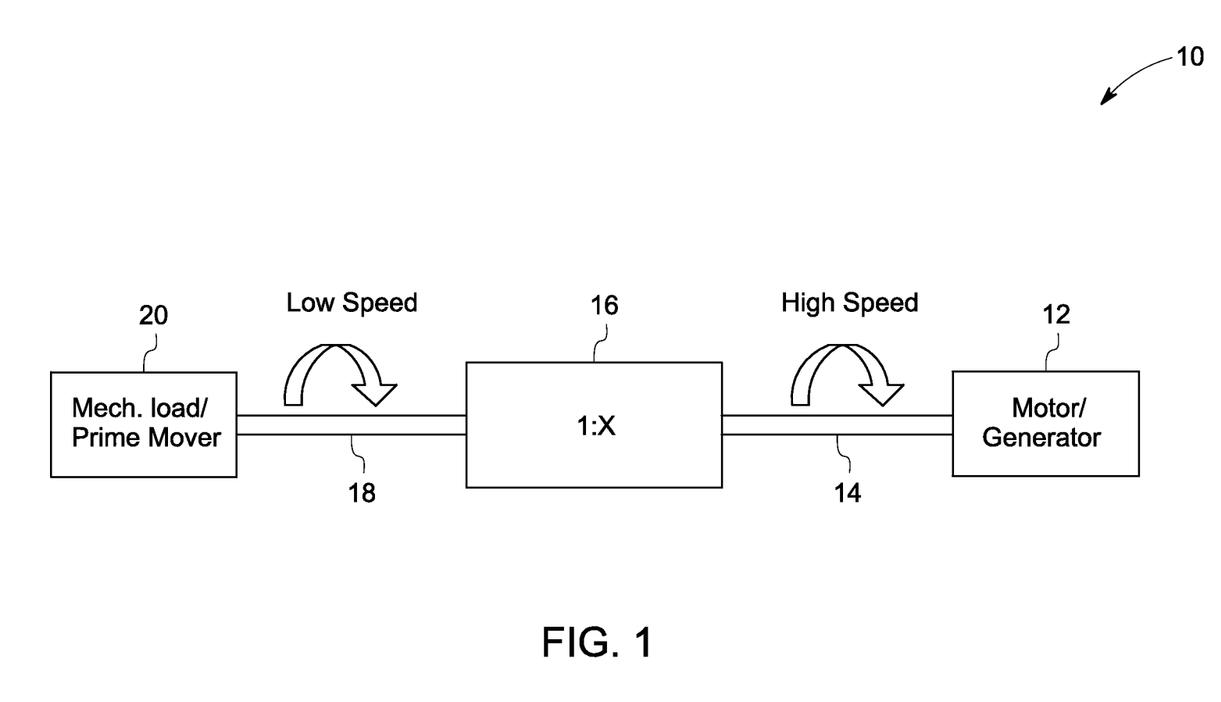
FIG. 1 is a schematic representation of an electromechanical energy conversion system employing magnetic gearing.

FIG. 1 represents a block diagram of an electromechanical system 10 that includes a mechanical load/prime mover 20, a magnetic gearing 16 and a motor/generator 12. The mechanical prime mover 20 is coupled via a low speed rotation shaft 18 to the magnetic gearing 16 having a gear ratio of 1:X, wherein X is a whole number. The magnetic gearing is coupled via a high speed rotation shaft 14 to the generator 12. In a generator configuration (mechanical energy to electrical energy), the low speed rotation of the prime mover 20 is converted to high speed rotation by the magnetic gearing 16 in the gear ratio 1:X. By way of example, if the low speed rotation shaft 18 turns at 90 rotations per minute (rpm) and the gear ratio is 1:20, then the high speed rotation shaft turns at 1800 rpm.

Conversely, in a motor configuration (electrical energy to mechanical energy) the motor is powered by an electrical source (not shown) driving the motor (e.g. 1800 rpm). The magnetic gearing 16 converts the high speed rotation shaft 14 to a low speed rotation shaft 18 (e.g. 90 rpm). According to an embodiment of the invention, the construction of the magnetic gearing is presented that may be implemented in system 10.

Figure 2:
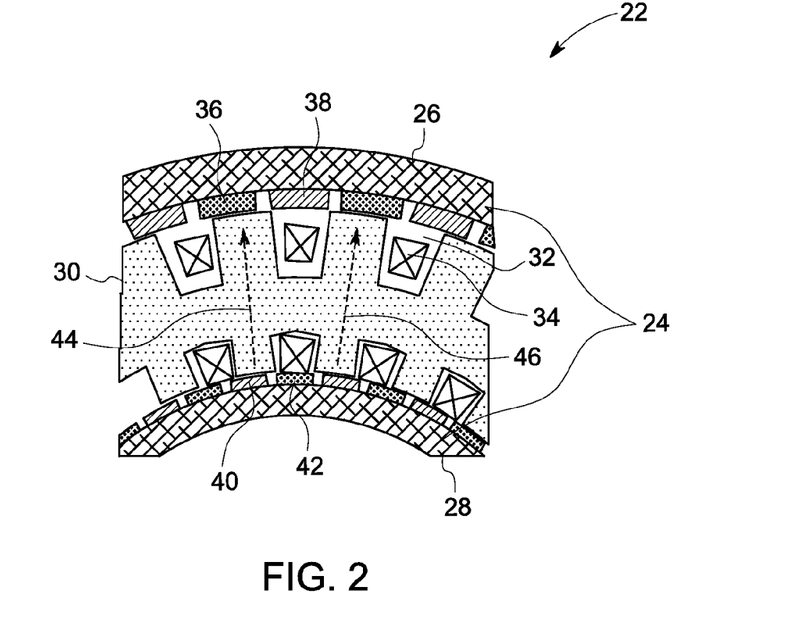
FIG. 2 is a diagrammatical cross sectional view of an electrical machine with a rotor-stator-rotor arrangement indicating radial flux linkage and configured to operate as a double-sided machine according to an aspect of the present technique.

Turning now to FIG. 2, an exemplary configuration of a magnetic gearing electrical machine 22 is illustrated. The magnetic gearing electrical machine 22 includes a rotor 24. The rotor 24 includes an outer rotor 26 having multiple outer rotor poles 36, 38 and an inner rotor 28 having multiple inner rotor poles 40, 42. In a particular embodiment, the inner rotor poles 36, 38 and the outer rotor poles 40, 42 include at least one of a multiple permanent magnets, wound rotors or field coils. In the illustrated embodiment, the inner rotor poles 36, 38 and the outer rotor poles 40, 42 are permanent magnets. A stator is provided to modulate magnetic flux and transmit torque. The stator includes a stator core interposed concentrically between the outer rotor 26 and the inner rotor 28. A number of stator teeth 30 and stator slots 32 are disposed on the stator core. The stator slots 32 are configured to accommodate stator windings 34. The stator windings 34 are further interconnected to form a number of stator poles.

In an exemplary embodiment, the inner rotor poles of the outer rotor 26 may be permanent magnets 36, 38 disposed on its inner surface and the outer rotor poles of the inner rotor 28 may be permanent magnets 40, 42 disposed in its outer surface. The permanent magnets 36, 38, 40 and 42 are together configured to form a number of rotor poles. The number of the rotor poles, the number stator poles and the stator teeth are configured to satisfy:

$$2*S_{TEETH} \pm S_{POLE} = R_{POLE} \quad (1)$$

wherein $S_{TEETH}$ refers to the number of stator teeth 30, $S_{POLE}$ refers to the number of stator poles and $R_{POLE}$ refers to the number of rotor poles. It may be appreciated that, in one embodiment, the equation (1) applies for the air gap that includes the inner rotor poles and the stator teeth. In another embodiment, the equation (1) applies for the air gap that includes outer rotor poles and the stator teeth.

The outer rotor 26 may be configured to operate at a lower speed than the inner rotor 28. During operation of the electrical machine 22, stator windings 34 are energized. Torque is transmitted by way of interaction between magnetic flux excited by stator windings 34 and magnetic flux excited by permanent magnet rotor poles 36, 38, 40 and 42. It may be noted that the orientation of magnetic flux depends on the alignment of the outer rotor poles 40, 42 and the inner rotor poles 36, 38. In one embodiment, the permanent magnet 38, 40 corresponds to a north pole and the permanent magnet 36, 42 corresponds to a south pole. In such a configuration magnetic flux propagates radially inward or outward with respect to an axis of rotation of the rotor indicated by the dashed lines 44 and 46.

Figure 3:
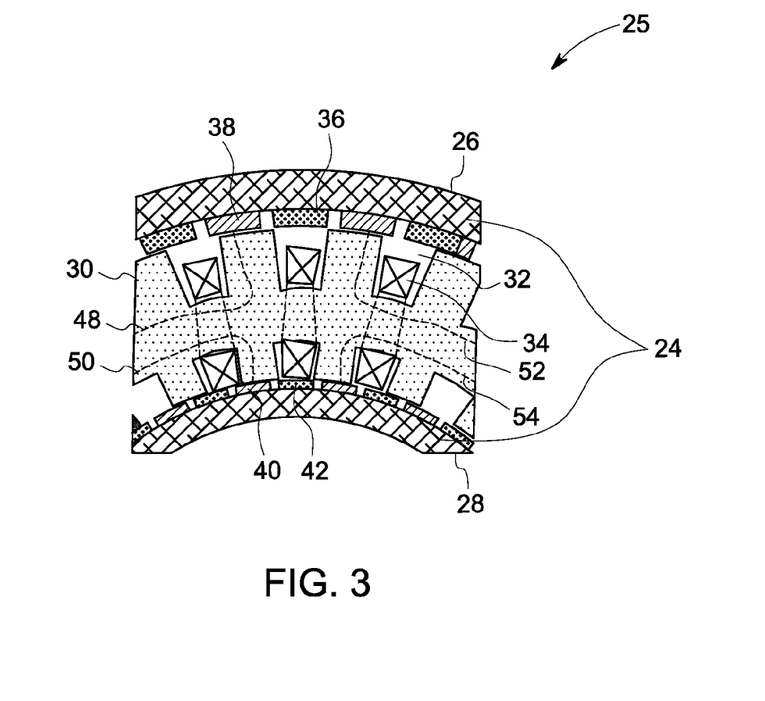
FIG. 3 is a further diagrammatical cross sectional view of the electrical machine in FIG. 2.

FIG. 3 illustrates another exemplary embodiment of a magnetic gearing electrical machine 25 having rotor-stator-rotor configuration with a fractional shift in alignment of the inner rotor poles 40, 42 of the inner rotor as referenced in FIG. 2 and the outer rotor poles 36, 38 of the outer rotor as referenced in FIG. 2. The fractional shift in alignment results in propagation of a magnetic flux 48, 50, 52, 54 along a direction parallel to an axis of rotation of the rotor 24. The permanent magnets 36, 38, 40 and 42 are configured to form a number of rotor poles. The number of the rotor poles, the number of stator poles and the stator teeth are chosen to satisfy equation (1). In a particular embodiment, the permanent magnet 36, 42 corresponds to a south pole and the permanent magnet 38, 40 corresponds to a north pole, resulting in the magnetic flux propagating along a circumferential direction with respect to an axis of rotation of the rotor indicated by the dashed lines 48, 50, 52 and 54.

Figure 4:
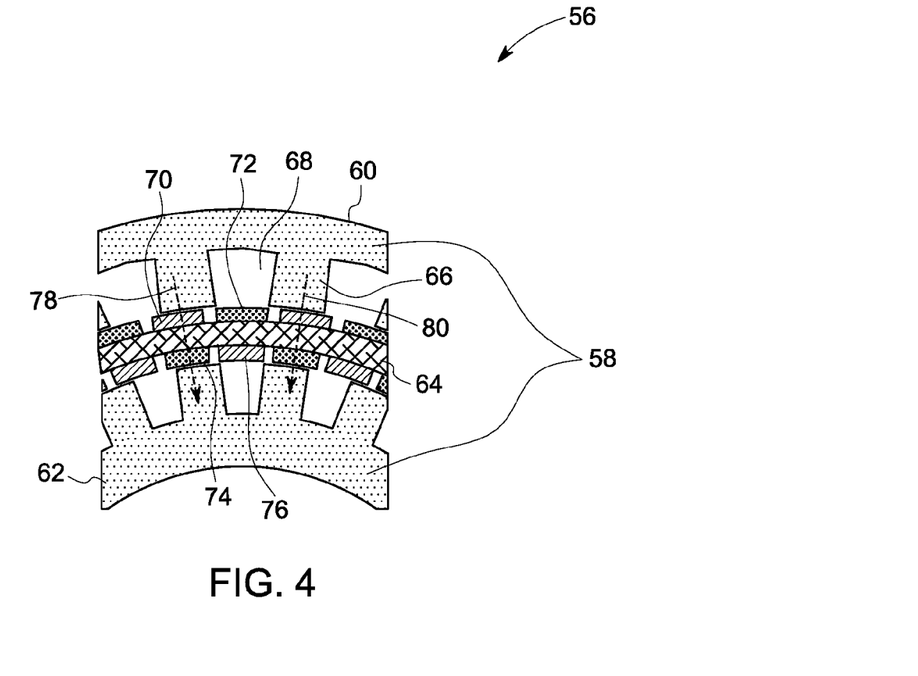
FIG. 4 is a diagrammatical cross sectional view of an electrical machine with a stator-rotor-stator arrangement indicating radial flux linkage and configured to operate as a magnetic gear according to an aspect of the present technique.

FIG. 4 is a diagrammatic representation of cross sectional view of a magnetic gearing electrical machine 56 having stator-rotor-stator configuration. The magnetic gearing electrical machine 56 includes a stator 58. The stator 58 includes an outer stator 60 and an inner stator 62. The outer stator 60 and the inner stator 62 include multiple stator teeth 66 and stator slots 68 disposed on respective stator cores. The stator 58 is configured to modulate a magnetic flux and transmit torque. The stator slots 68 are configured to accommodate stator windings (not shown) that are further interconnected to form a number of stator poles. A rotor having a rotor core 64 is interposed concentrically between the outer stator and the inner stator. The rotor core 64 includes multiple rotor poles 70, 72 disposed on its outer surface and multiple rotor poles 74, 76 disposed on its inner surface. In a particular embodiment, the rotor poles 70, 72, 74 and 76 include at least one of multiple permanent magnets, wound rotors or field coils. In the illustrated embodiment, the inner rotor poles 74, 76 and the outer rotor poles 70, 72 are permanent magnets. These permanent magnets 70, 72, 74 and 76 are together configured to form a number of rotor poles. The number of the rotor poles, the number stator poles and the stator teeth are chosen to satisfy equation (1).

During operation of the electrical machine 56, stator windings are energized. Torque is transmitted by way of interaction between magnetic flux excited by stator windings and magnetic flux excited by permanent magnet rotor poles 70, 72, 74 and 76. It may be noted that the orientation of magnetic flux depends on the alignment of the rotor poles 70, 72, 74 and 76. In one embodiment, the permanent magnet 70, 76 corresponds to a south pole and the permanent magnet 72, 74 corresponds to a north pole. In such a configuration magnetic flux propagates radially inward or outward with respect to an axis of rotation of the rotor indicated by the dashed lines 78 and 80.

Figure 5:
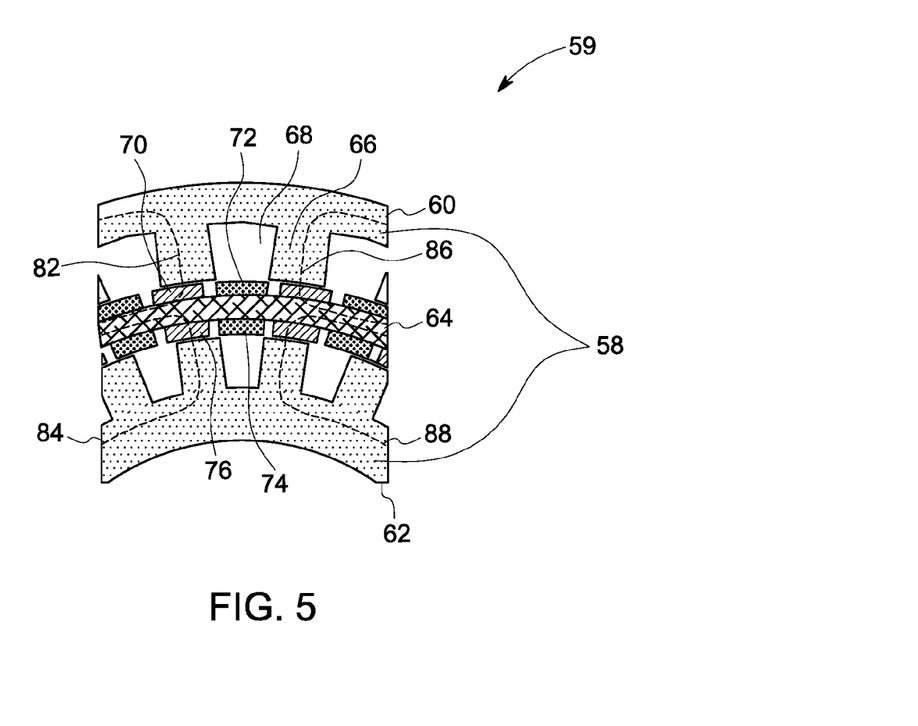
FIG. 5 is a further diagrammatical cross sectional view of the electrical machine in FIG. 4.

FIG. 5 illustrates another exemplary embodiment of a magnetic gearing electrical machine 59 having stator-rotor-stator configuration with a fractional shift in alignment of the rotor poles 70, 72 as referenced in FIG. 4 and the rotor poles 74, 76 as referenced in FIG. 4. The fractional shift in alignment results in propagation of a magnetic flux 82, 84, 86, and 88 along a circumferential direction with respect to an axis of rotation of the rotor core 64. The permanent magnets 70, 72, 74 and 76 are configured to form a number of rotor poles. The number of the rotor poles, the number of stator poles and the stator teeth are chosen to satisfy equation (1). In a particular embodiment, the permanent magnet 70, 76 corresponds to a south pole and the permanent magnet 72, 74 corresponds to a north pole, resulting in the magnetic flux propagating along a circumferential direction with respect to an axis of rotation of the rotor indicated by the dashed lines 82, 84, 86 and 88.

Figure 6:
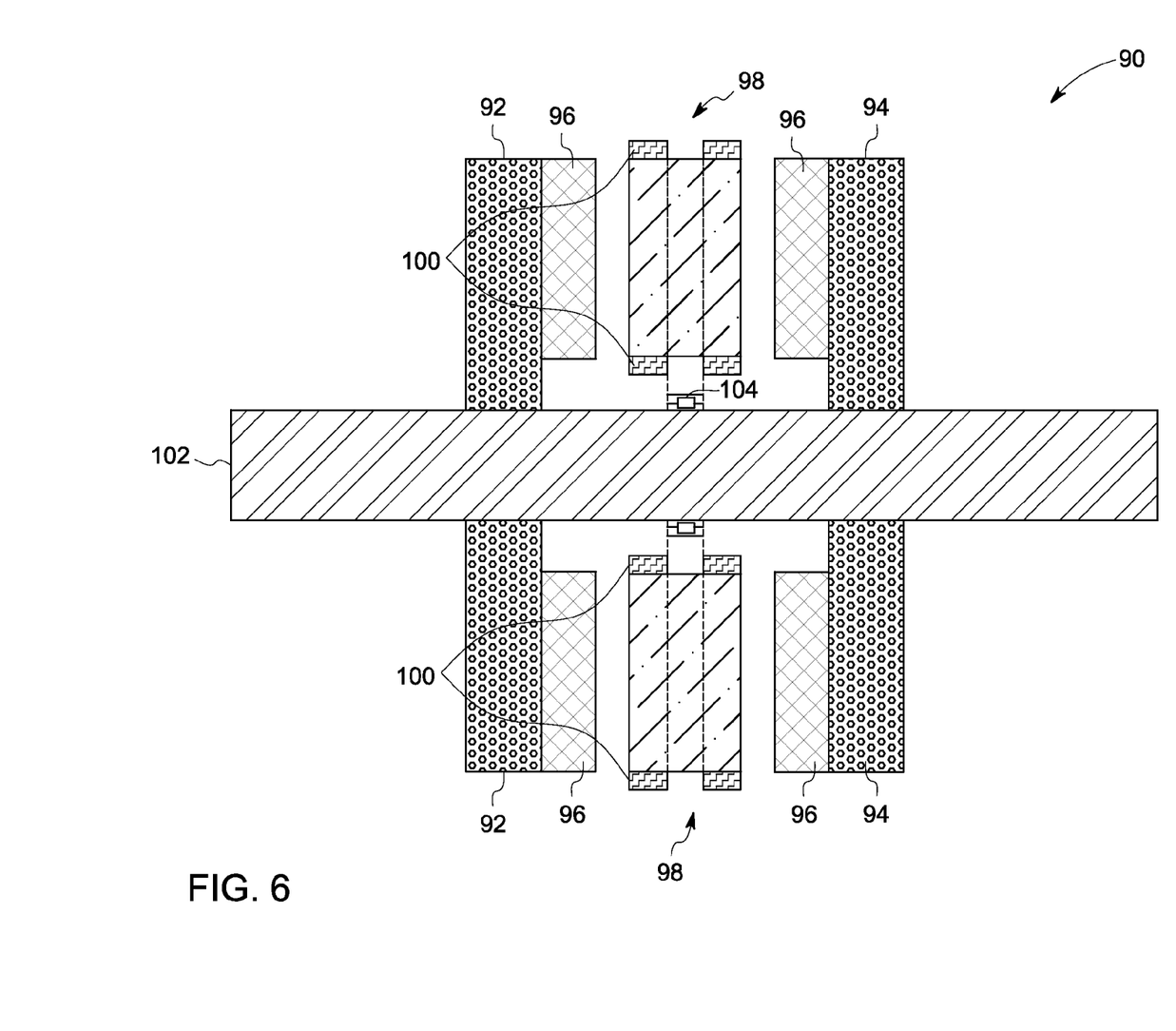
FIG. 6 is a diagrammatical cross sectional view of an axial electrical machine with a rotor-stator-rotor arrangement and configured to operate as a magnetic gear according to an aspect of the present technique.

Turning now to FIG. 6, an axial electrical machine with a rotor-stator-rotor configuration is illustrated. The axial electrical machine 90 includes at least a pair of rotors that include rotor core 92 and 94 disposed on a central non-magnetic shaft 102. Rotor poles 96 are disposed adjacent to the rotor core 92 and 94. At least one stator 98 is disposed on the non-magnetic shaft 102 via bearing 104 and interposed axially between the rotor core 92 and 94. The stator includes stator teeth (not shown) and stator slots (not shown) to accommodate stator windings 100 that are further interconnected to form stator poles. The stator winding configurations may include but are not limited to a lapped or toroidal winding. The number of the rotor poles, the number of stator poles and the stator teeth are chosen to satisfy equation (1). Magnetic flux propagation is illustrated below in FIGS. 7 and 8.

Figure 7:
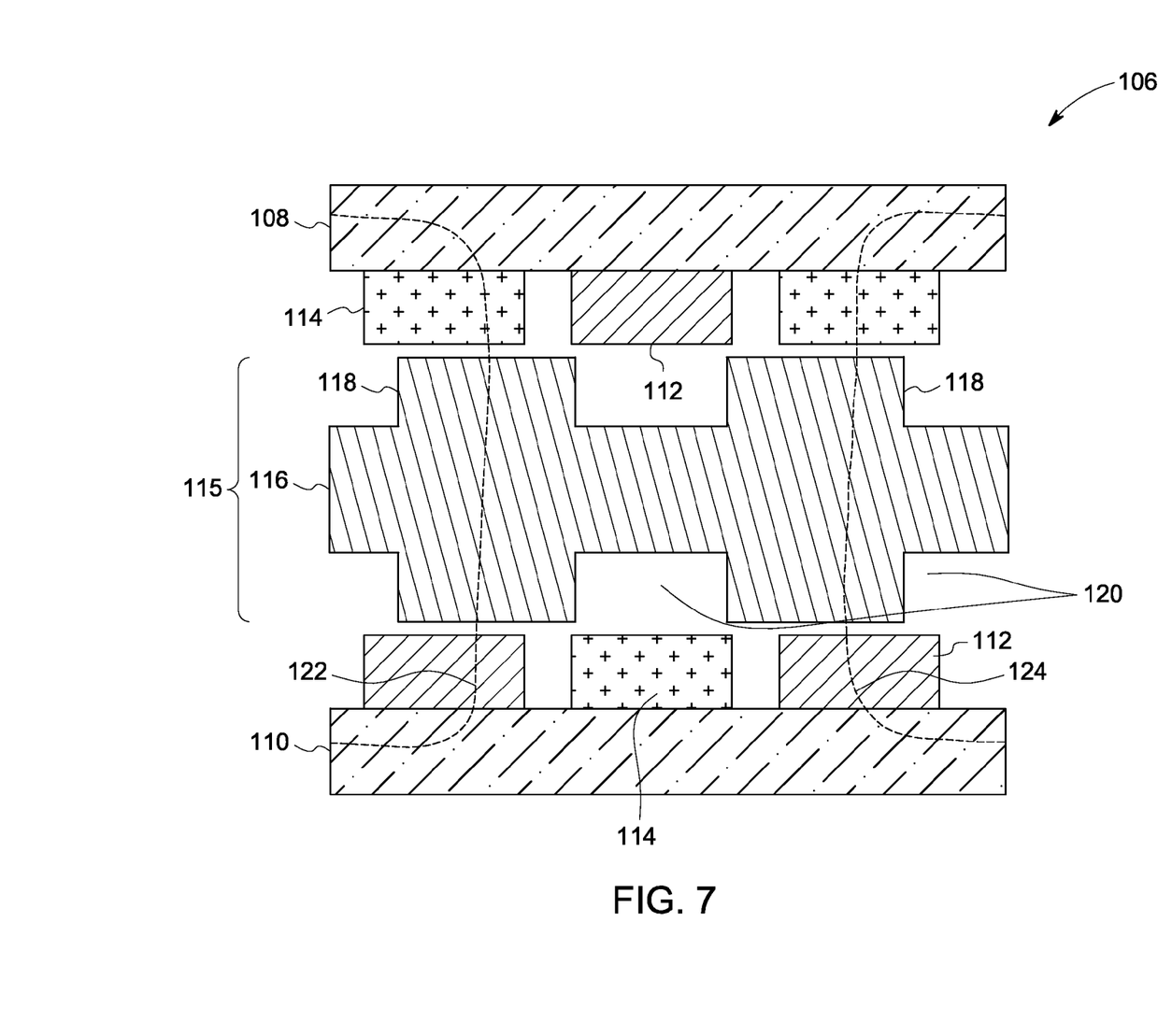
FIG. 7 is a further diagrammatical cross sectional view of an axial electrical machine as depicted in FIG. 6.

FIG. 7 is a diagrammatical representation of cross sectional view of axial electrical machine of FIG. 6 illustrating the magnetic flux. The rotor-stator-rotor configuration of axial electrical machine 106 includes at least a pair of rotors 108, 110. The rotors 108, 110 include multiple rotor poles 112, 114 respectively. In a particular embodiment, the rotor poles 112, 114 include at least one of multiple permanent magnets, wound rotors or field coils. In the illustrated embodiment, the rotor poles 112, 114 are permanent magnets. A stator 115 is provided to modulate magnetic flux and transmit torque. The stator includes a stator core 116 interposed axially between the rotors 108, 110. A number of stator teeth 118 and stator slots 120 are disposed on the stator core. The stator slots 120 are configured to accommodate stator windings (not shown) that are further interconnected to form a number of stator poles. The stator winding configurations may include but not limited to a lapped or toroidal winding. As an exemplary embodiment, the rotors 108, 110 include permanent magnets 112, 114 disposed on a surface as illustrated. These permanent magnets 112, 114 are configured to form a number of rotor poles. The number of the rotor poles, the number stator poles and the stator teeth are chosen to satisfy equation (1).

The rotor 108 may be configured to operate at a lower speed than the rotor 110. During operation of the electrical machine 106, stator windings are energized. Torque is transmitted by way of interaction between magnetic flux excited by stator windings and magnetic flux exited by permanent magnet rotor poles 112 and 114. It may be noted that the orientation of magnetic flux depends on the alignment of the rotor poles on the rotors 108 and 110. In one embodiment, the permanent magnet 112 corresponds to a north pole and the permanent magnet 114 corresponds to a south pole. In such a configuration magnetic flux propagates in the stator core 116 along a direction parallel to an axis of rotation of the rotor indicated by the dashed lines 122 and 124.

Figure 8:
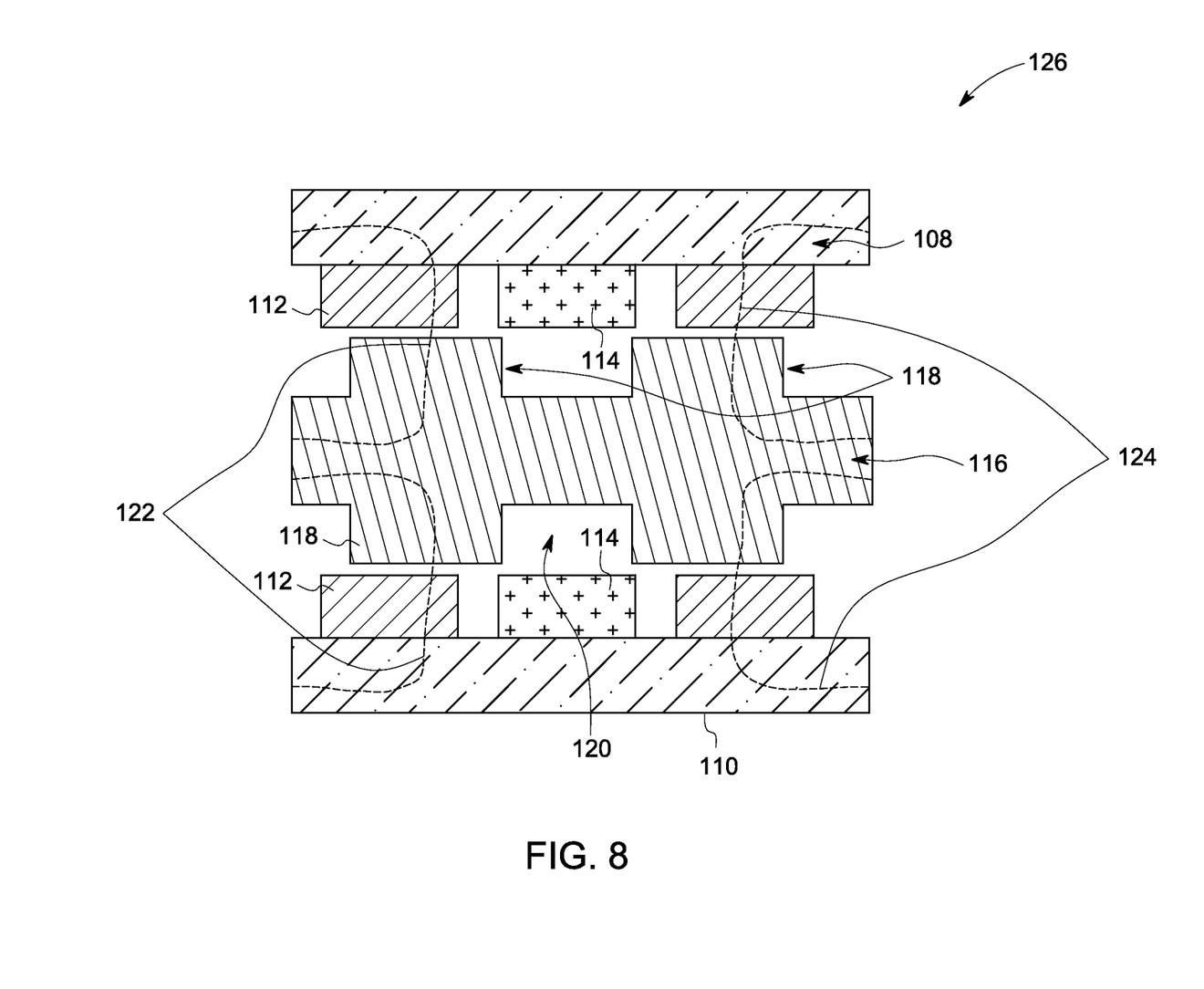
FIG. 8 is a further diagrammatical cross sectional view of an axial electrical machine as depicted in FIG. 6 with a rotor-stator-rotor arrangement indicating the circumferential flux in the stator.

FIG. 8 illustrates another exemplary embodiment of an axial electrical machine 126 having rotor-stator-rotor configuration with a fractional shift in alignment of the rotor poles 112, 114 as referenced in FIG. 7. The fractional shift in alignment results in propagation of a magnetic flux 122 and 124 in the stator core 116 along the circumferential direction with respect to an axis of rotation of the rotors 108, 110. The permanent magnets 112 and 114 are configured to form a number of rotor poles. The number of the rotor poles, the number of stator poles and the stator teeth are chosen to satisfy equation (1). In a particular embodiment, the permanent magnet 112 corresponds to a north pole and the permanent magnet 114 corresponds to a south pole, resulting in the magnetic flux propagating along a direction parallel to an axis of rotation of the rotor indicated by the dashed lines 122 and 124.

Figure 9:
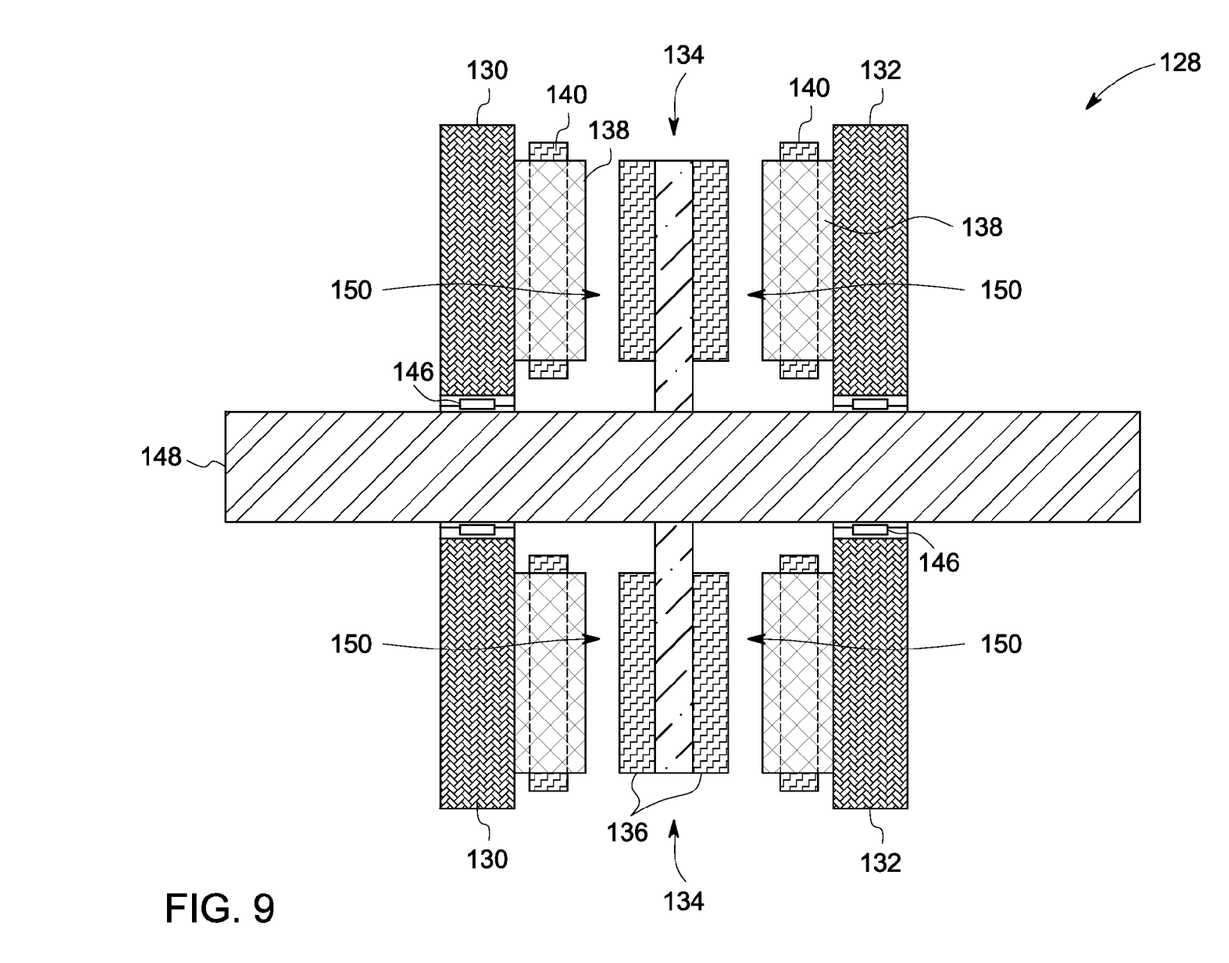
FIG. 9 is a diagrammatical cross sectional view of another axial electrical machine with a stator-rotor-stator arrangement and configured to operate as a magnetic gear according to an aspect of the present technique.

FIG. 9 illustrates an axial electrical machine with a stator-rotor-stator configuration. The axial electrical machine 128 includes at least a pair of stators. The stators include stator cores 130, 132 and are disposed on a central non-magnetic shaft 148 via bearings 146. The stator 130, 132 cores include stator teeth 138 to accommodate stator windings 140 that are further interconnected to form stator poles. At least one rotor 134 is interposed axially between the stators 130 and 132 to form air gaps 150. The rotor 134 is disposed on the non-magnetic shaft 148. Multiple rotor poles 136 are disposed on the rotor 134. The number of rotor poles, the number of stator poles and the stator teeth are chosen to satisfy equation (1). It may be noted that the equation applies to each of the air gaps 150. Magnetic flux propagation is illustrated below in FIGS. 10 and 11.

Figure 10:
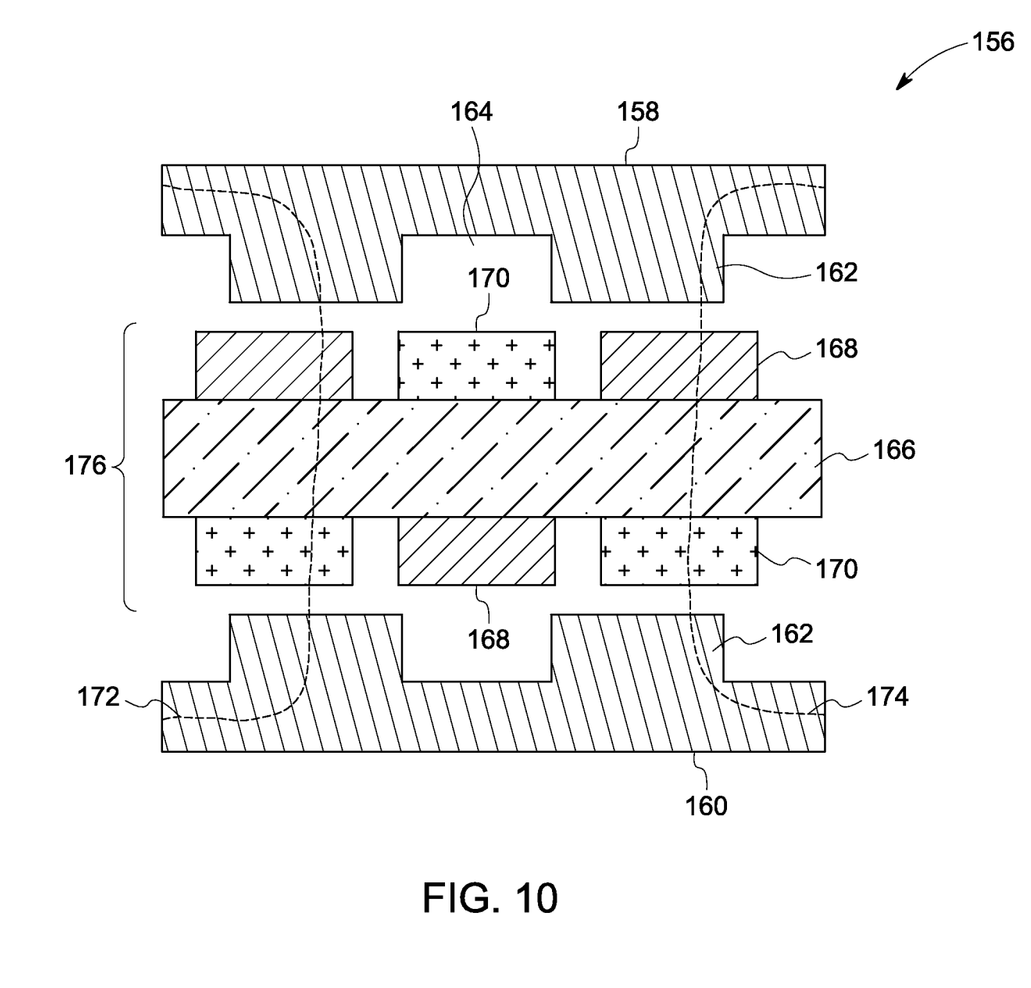
FIG. 10 is a further diagrammatical cross sectional view of an axial electrical machine as depicted in FIG. 9.

FIG. 10 is a diagrammatical representation of cross sectional view of axial electrical machine of FIG. 9 illustrating the magnetic flux. The stator-rotor-stator configuration of axial electrical machine 156 includes at least a pair of stators 158, 160. The stators 158, 160 include multiple stator teeth 162 and stator slots 164, the stators further configured to modulate magnetic flux and transmit torque. The stator slots 164 are configured to accommodate stator windings (not shown) further interconnected to form stator poles. The stator winding configurations may include but are not limited to a lapped or toroidal winding. A rotor 176 is interposed axially between the stators 158, 160. Rotor poles 168, 170 are disposed on a rotor core 166. In a particular embodiment, the rotor poles 168, 170 include at least one of multiple permanent magnets, wound rotors or field coils. In the illustrated embodiment, the rotor poles 168, 170 are permanent magnets. These permanent magnets 168, 170 are configured to form a number of rotor poles. The number of the rotor poles, the number stator poles and the stator teeth are chosen to satisfy equation (1).

During operation of the electrical machine stator windings are energized. Torque is transmitted by way of interaction between magnetic flux excited by stator windings and magnetic flux excited by permanent magnet rotor poles 168, 170. It may be noted that the orientation of magnetic flux depends on the alignment of the rotor poles. In one embodiment, the permanent magnet 168 corresponds to a north pole and the permanent magnet 170 corresponds to a south pole. In such a configuration magnetic flux propagates in the rotor 116 along a direction parallel to an axis of rotation of the rotor indicated by the dashed lines 172 and 174.

Figure 11:
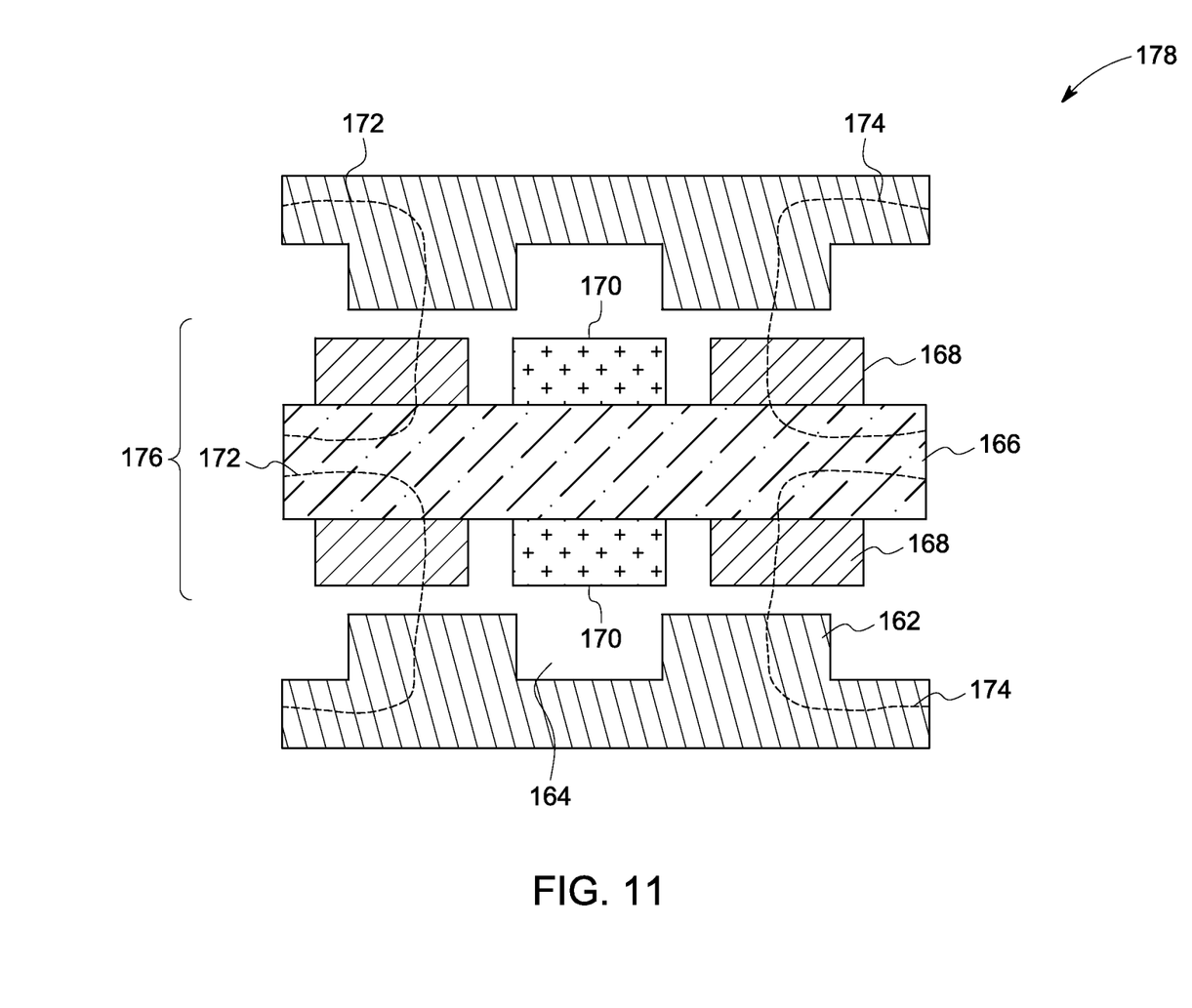
FIG. 11 is a further diagrammatical cross sectional view of an axial electrical machine as depicted in FIG. 9 with a stator-rotor-stator arrangement indicating the circumferential flux in the rotor.

FIG. 11 illustrates another exemplary embodiment of an axial electrical machine 178 having stator-rotor-stator configuration with a fractional shift in alignment of the rotor poles 168, 170 as referenced in FIG. 10. The fractional shift in alignment results in propagation of a magnetic flux 172 and 174 in the rotor 166 along a circumferential direction with respect to an axis of rotation of the rotor 176. The permanent magnets 168 and 170 are configured to form a number of rotor poles. The number of the rotor poles, the number of stator poles and the stator teeth are chosen to satisfy equation (1). In a particular embodiment, the permanent magnet 168 corresponds to a north pole and the permanent magnet 170 corresponds to a south pole, resulting in the magnetic flux propagating in the rotor 166 along a circumferential direction with respect to an axis of rotation of the rotor indicated by the dashed lines 172 and 174.

Figure 12:
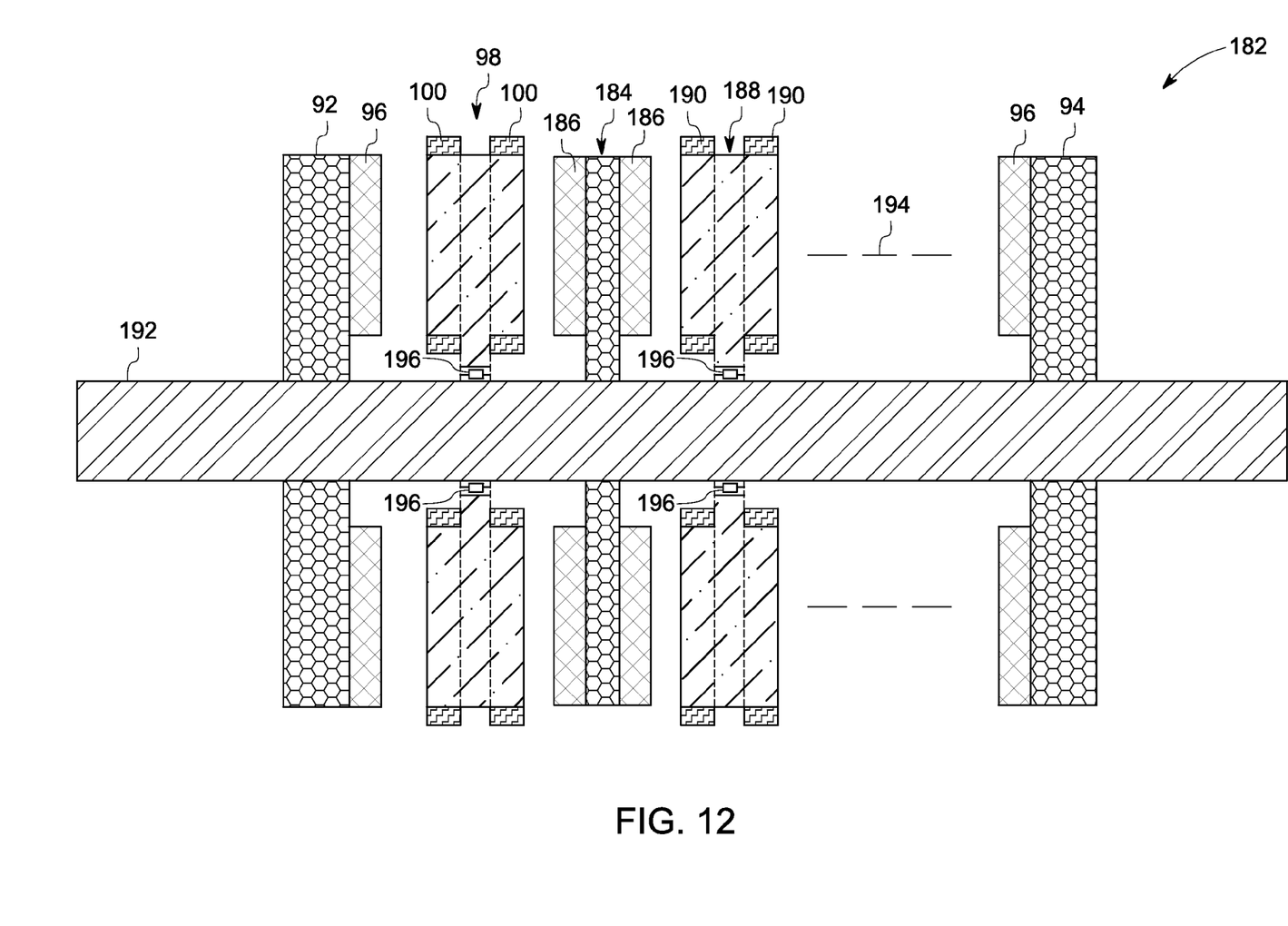
FIG. 12 is a diagrammatical cross sectional view of a further axial electrical machine with a multiple rotor-stator-rotor arrangement and configured to operate as a magnetic gear according to an aspect of the present technique.

FIG. 12 is a further diagrammatic representation of the axial electrical machine 90 in FIG. 6 illustrating an exemplary axial electrical machine 182 employing a stator 98, as referenced in FIG. 6 between each pair of multiple rotors 92, 184. The axial electrical machine 182 includes rotors 92, 184 and 94, and stators 98 and 188 that are disposed on a central non-magnetic shaft 192. In the illustrated embodiment, stator 188 is interposed between rotors 184 and 94. It may be noted that multiple stators may be disposed between two rotors as illustrated by reference numeral 194. Furthermore, the rotors 92, 94 include rotor poles 96 disposed on a surface of the rotors. Similarly, rotor poles 186 are disposed on a surface of the rotor 184. The rotors 92, 94 and 184 are fixed on to the non-magnetic shaft. Stators 98 and 188 include stator windings 100 and 190 respectively. According to one embodiment of the invention, the stators are fixed on to the non-magnetic shaft 192 via bearings 196. The stator windings are interconnected to form stator poles.

Figure 13:
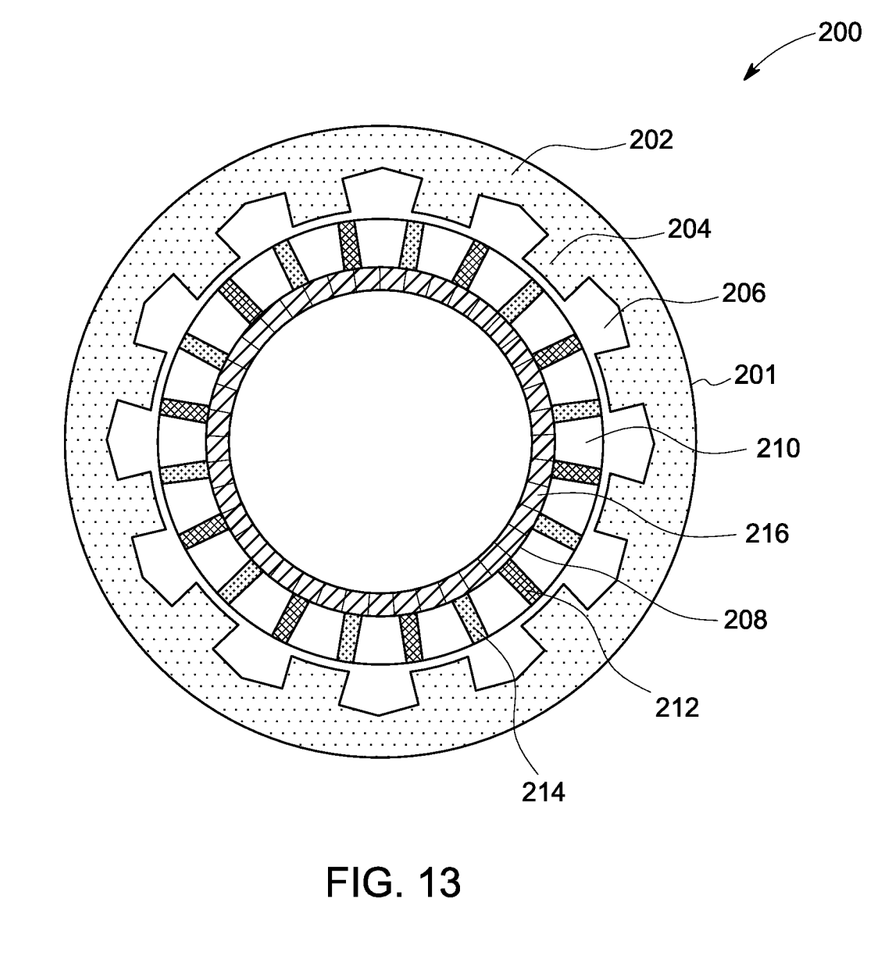
FIG. 13 is a diagrammatical cross sectional view of an electrical machine with permanent magnets embedded on rotor core and configured to form rotor poles.

Turning now to FIG. 13, a sectional view of an electrical machine with embedded permanent magnets configured as rotor poles is illustrated. The electrical machine 200 includes rotor 208, rotor core 210, and permanent magnets 212 and 214 embedded radially within the rotor core 210. The rotor core 210 is further disposed around a support shaft 216. Moreover, a stator 201 includes a stator core 202 disposed concentrically outside the rotor core 210. Multiple stator teeth 204 are configured to form stator slots 206 between respective stator teeth 204. The permanent magnets 212, 214 are configured to form a number of rotor poles. The stator slots are configured to accommodate stator windings (not shown) that are further interconnected to form stator poles. In an exemplary embodiment, the stator windings may include coils made from super conducting material. The number of the rotor poles, the number stator poles and the stator teeth are chosen to satisfy equation (1). In the illustrated embodiment, the electrical machine 200 employs a conventional design. However, it will be appreciated that the electrical machine 200 may be designed in an inside-out configuration, wherein the rotor 208 is disposed outside circumferentially around the stator 201. In an exemplary embodiment, in the inside-out configuration, the rotor poles may include structures such as, but not limited to, embedded magnets or surface mounted permanent magnets.

During operation of the electrical machine 200 stator windings are energized. Torque is transmitted by way of interaction between magnetic flux excited by stator windings and magnetic flux exited by permanent magnet rotor poles 212, 214. In one embodiment, the permanent magnet 212 corresponds to a north pole and the permanent magnet 214 corresponds to a south pole.

Figure 14:
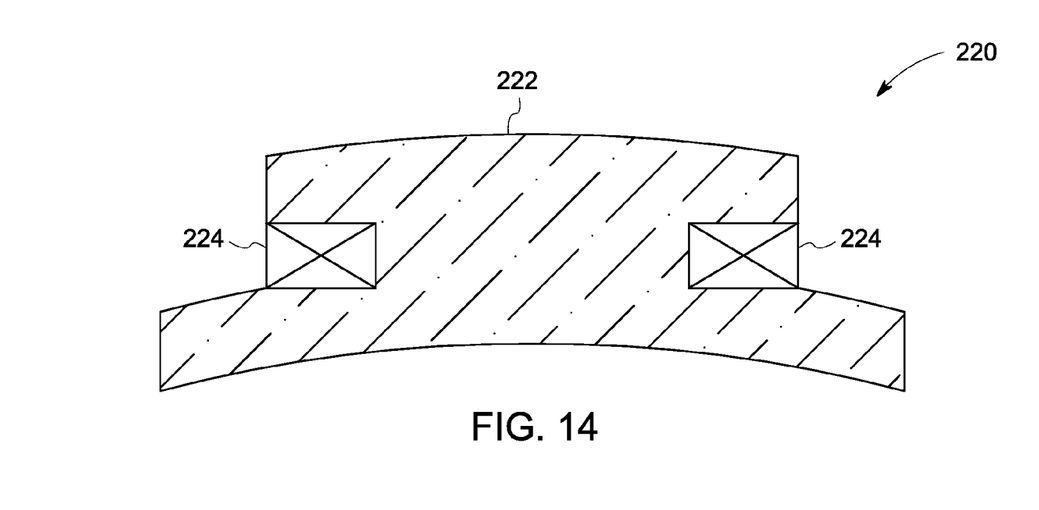
FIG. 14 is a diagrammatical sectional view of the rotor poles including field coils.

FIG. 14 is a diagrammatical cross sectional view of an exemplary rotor pole 220 (also referred as field coil configuration) including a field winding 224. The construction of the rotor pole 220 includes a rotor core 222 that may be made of magnetic material and includes slots configured to accommodate field windings 224 around the rotor core 222. The field windings may be energized by a direct current source. The configuration of the rotor pole 220 is determined by the direction of current through the field windings 224. Such configuration of rotor pole 220 may be incorporated in rotor poles of machines illustrated in FIGS. 2, 4, 6, 9 and 12.

Figure 15:
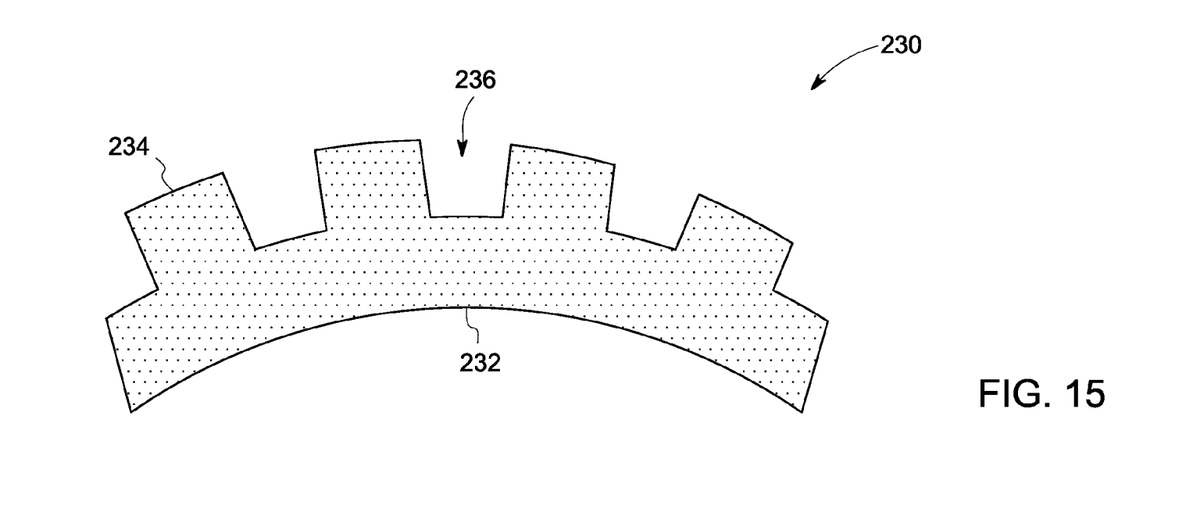
FIG. 15 is a diagrammatical sectional view of the rotor poles including rotor slots and teeth.

FIG. 15 is a diagrammatical representation of an exemplary rotor pole 230 including a wound rotor configuration. The rotor pole 230 includes rotor teeth 234 and rotor slots 236 that are formed alternatively on the rotor core 232. Such teeth and slot configuration of rotor poles 230 (sometimes referred to as reluctance rotor poles) as illustrated herein may be incorporated in rotor poles of machines illustrated in FIGS. 2, 4, 6, 9 and 12.

Figure 16:
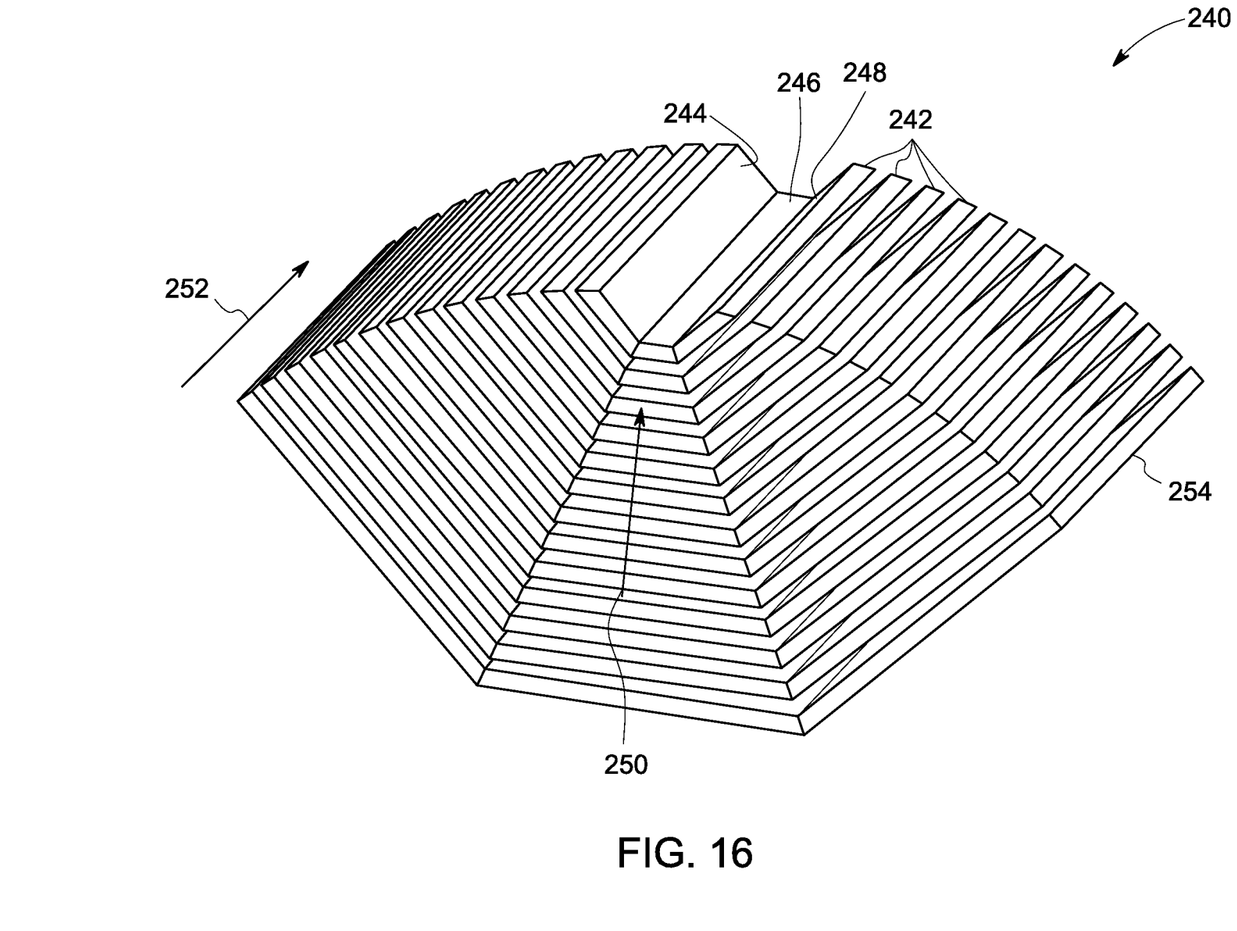
FIG. 16 is a diagrammatical sectional view of the rotor poles including axial laminations to produce reluctance torque.

FIG. 16 is a diagrammatical representation of an exemplary rotor pole 240 including axial laminations 242. Such axial laminations 242 may be incorporated in electrical machines that require reluctance torque. Multiple axial laminations such as 240 are stacked one above the other to form a core upon which magnetic flux propagation may be facilitated. Axial laminations 242 include three faces 244, 246 and 248. A radial width of each of the axial lamination 242 varies along a direction illustrated by reference numeral 250. However, a width 252 remains constant to provide support that may facilitate disposing the axial laminations 242 and 254 on a base (not shown). Such a configuration of the rotor pole 240 may be incorporated in rotor poles of the electrical machines illustrated in FIGS. 2, 4, 6, 9 and 12.

Advantageously, the foregoing system provides a cost effective and convenient means of construction of electrical machines that may be employed in a magnetic gearing. Such constructions also facilitate a higher torque density. Further, a selective number of stator teeth, stator poles and rotor poles satisfying equation (1) provide a desirable stator flux pattern across a rotor. Higher torque densities enable substantial reduction in machine size. Rotating machine with reduced construction mass have other numerous advantages such as reduced mechanical wear and tear, easier handling, and economical for increased torque requirement. Furthermore, direct drive applications find numerous advantages incorporating higher torque density machines.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrical machine comprising:
    a rotor comprising:
        an inner rotor having a plurality of inner rotor poles; and
        an outer rotor having a plurality of outer rotor poles; and
    a stator configured to modulate a magnetic flux and to transmit torque to the inner rotor and the outer rotor, the stator comprising:
        a stator core interposed concentrically between the inner rotor and the outer rotor;
        a plurality of stator windings disposed in a plurality of stator slots, the stator windings configured to form a plurality of stator poles; and
        a plurality of stator teeth interposed between the plurality of stator slots, wherein an arithmetic sum or difference of twice a total number of stator teeth and a total number of the stator poles equals a total number of rotor poles.

2. The machine of claim 1, wherein the magnetic flux propagates radially inward or outward with respect to an axis of rotation of the rotor.

3. The machine of claim 1, wherein the magnetic flux propagates along a circumferential direction with respect to an axis of rotation of the rotor.

4. The machine of claim 1, wherein the inner rotor poles and the outer rotor poles comprise at least one of a plurality of permanent magnets, wound rotors or field coils.

5. The machine of claim 1, wherein the number of rotor poles comprises the total number of rotor poles of both the inner and outer rotor.

6. The machine of claim 1, wherein the number of stator teeth and the number of stator poles comprises the total number stator teeth and the total number of stator poles.

7. The machine of claim 1, wherein the number of rotor poles, stator teeth, and stator poles comprises the total number of rotor poles, stator teeth, and stator poles.

* * * * *